(12) United States Patent
Nordquist

(10) Patent No.: US 6,219,893 B1
(45) Date of Patent: Apr. 24, 2001

(54) COUPLING FOR CLAMPING A PALLET

(75) Inventor: Hakon Nordquist, Täby (SE)

(73) Assignee: System 3R International AB, Vällingby (SE)

( * ) Notice: Subject to any disclaimer, the term of this patent is extended or adjusted under 35 U.S.C. 154(b) by 0 days.

(21) Appl. No.: 09/390,664

(22) Filed: Sep. 7, 1999

(30) Foreign Application Priority Data

Mar. 6, 1998 (DE) .............................................. 198 09 689

(51) Int. Cl.[7] ...................................................... B23Q 3/02
(52) U.S. Cl. ...................... 29/33 P; 198/345.3; 269/309; 279/133; 279/156; 409/225
(58) Field of Search ............................. 29/33 P; 269/309; 409/225, 219, 172, 174; 198/345.2, 345.3; 279/133, 904, 156

(56) References Cited

U.S. PATENT DOCUMENTS

| 4,655,655 | | 4/1987 | Schürfeld . | |
|---|---|---|---|---|
| 4,662,043 | * | 5/1987 | Stone et al. ............................. | 29/33 P |
| 4,890,522 | * | 1/1990 | Nader et al. ............................ | 82/142 |
| 5,184,810 | * | 2/1993 | Lebrecht ........................... | 29/33 P X |
| 5,199,158 | * | 4/1993 | Wioskowski et al. ........... | 29/33 P X |
| 5,222,285 | * | 6/1993 | Horikawa ............................... | 29/33 P |
| 5,326,114 | * | 7/1994 | Piotrowski et al. ................ | 279/4.05 |
| 5,743,687 | * | 4/1998 | Ribic et al. .......................... | 409/225 |
| 5,771,752 | * | 6/1998 | Bissett .............................. | 409/233 X |
| 5,885,039 | * | 3/1999 | Boisvert ........................... | 409/233 X |
| 6,073,325 | * | 6/2000 | Stark ................................... | 29/33 P |

FOREIGN PATENT DOCUMENTS

| 198 09 689 A1 | 9/1999 | (DE) . |
|---|---|---|
| 0 169 543 A2 | 1/1986 | (EP) . |
| 0 175 902 A1 | 4/1986 | (EP) . |
| 97/18918 | 5/1997 | (WO) . |

* cited by examiner

*Primary Examiner*—William Briggs
(74) *Attorney, Agent, or Firm*—Jacobson, Price, Holman & Stern, PLLC

(57) ABSTRACT

Described is a coupling, provided at the spindle head of a machine tool, for clamping an especially plate-shaped work-holding fixture, for example a pallet, in a specified, repeatable and precise position relative to a spatial reference system, wherein the spindle head exhibits a collet, which can be moved axially and radially with respect to its face. To increase the accuracy when machining a workpiece, there is a plate, which is to be connected to the face and is provided with spatial references on the front side, and which has a central passage opening to receive a tension rod, connected to the backside of the work-holding fixture, and a bolt, whose front end can be coupled with the tension rod and whose rear end can be connected to the collet.

10 Claims, 2 Drawing Sheets

COUPLING FOR CLAMPING A PALLET

SPECIFICATION

The invention relates to a coupling, provided at the spindle head of a machine tool, for clamping an especially plate-shaped work-holding fixture, for example a pallet, in a specified, repeatable and precise position relative to a spatial reference system, wherein the spindle head exhibits a collet, which can be moved axially and radially with respect to its face.

The collet usually serves to grasp a workpiece, which is to be machined by an automatic lathe, a milling machine or the like. Said workpiece is tightened by the collet, for example in an internal cone, provided at the spindle head, for the purpose of positioning. However, the internal cone does not constitute a sufficiently accurate reference for the purpose of numerically controlling an automatic lathe so that sufficiently accurate, uniform and automatic machining of a large number of workpieces to be machined in succession is difficult.

Therefore, the invention is based on the problem of increasing the accuracy of machining the workpiece in a machine tool, as described above.

For the aforementioned coupling, according to the invention, there is also a plate, which is to be connected to the face and is provided with spatial references on the front side. Said plate has a central passage opening to receive a tension rod, connected to the backside of the work-holding fixture, and a bolt, whose rear end can be connected to the collet and whose front end can be coupled with the tension rod. The coupling of the invention leads to significantly higher accuracy of the automatic, numerically controlled machining of the workpiece, is not limited to use with a specific clamping system and finally allows the user the simple transition to known couplings, for example, according to the ISO standard, through removal of the plate and the bolt in the case that there are still machining problems to be solved whose accuracy allows work with couplings according to the ISO standard.

In a preferred embodiment of the invention the bolt can be guided axially in the plate. Furthermore, it is recommended to provide at the front end of the bolt a ball lock, which interacts with the profile on the tension rod. For the connection of the rear end of the bolt with the collet it is recommended that either the end is screwed together with the collet or the end is coupled with the collet by means of a ball rim, engaging with a bolt profile. A good guide of the bolt during the collet movements is obtained, when a hollow cone, into whose axial passage borehole the bolt is guided, is fastened advantageously on the rear side of the plate. Furthermore, it is recommended that to increase the tension force there is at least one axially acting spring, which is braced against the plate and which rests against the bolt.

Other preferred embodiments of the invention are disclosed in the dependent claims.

The invention is explained in detail in the following with reference to the embodiment illustrated in the attached drawings. This embodiment uses an x, y, z orthogonal system as the spatial reference system.

Figure 1:
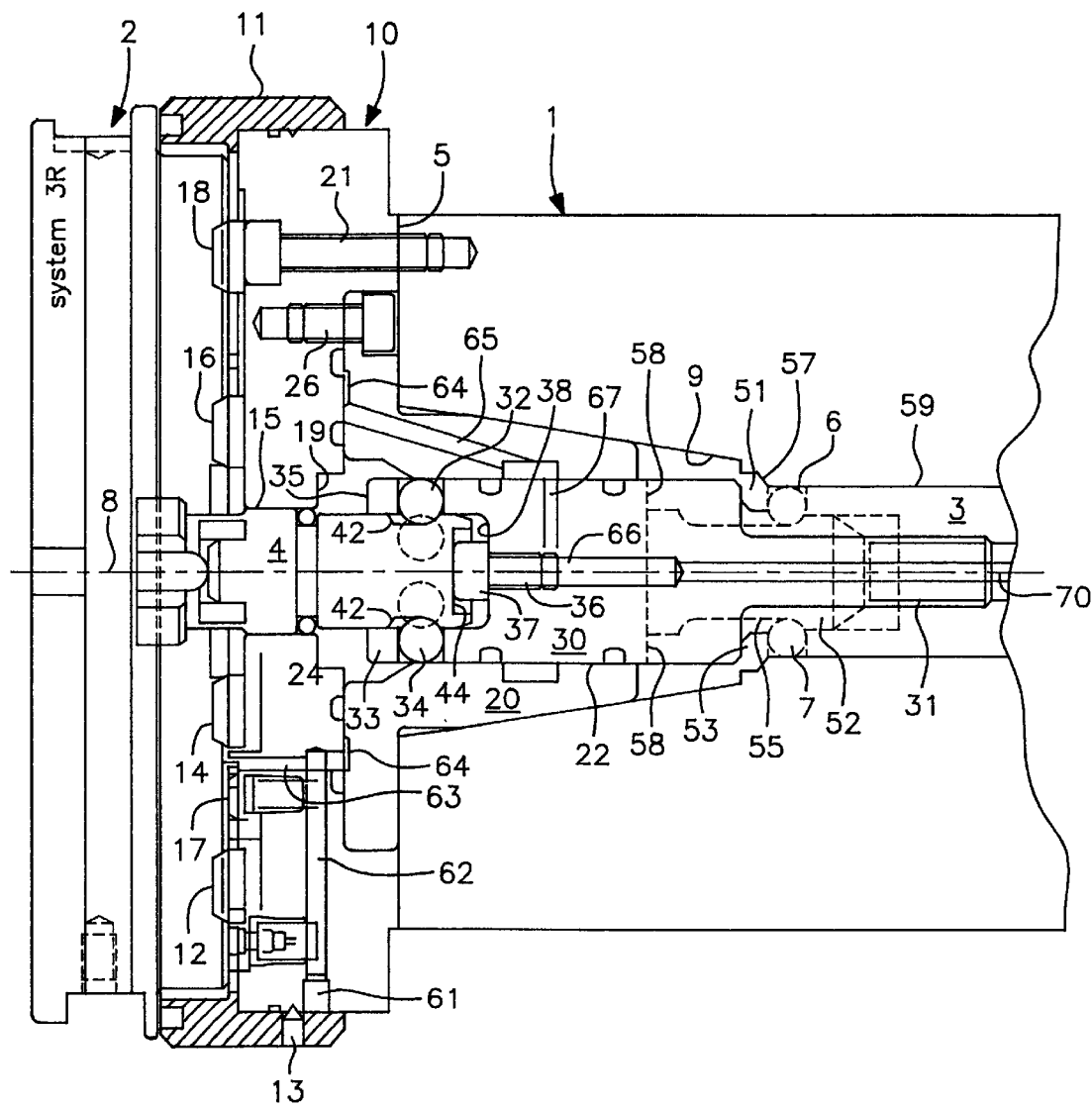
FIG. 1 is a diagrammatic axial view of the coupling of the invention with a clamped work-holding fixture and with the alternative possibility of a coupling between bolt and collet. Said possibility is indicated by the dash-dotted line.

The spindle head 1 of an automatic milling machine, grinding machine, lathe, or the like, has a central axis of rotation 8, a free face 5, which extends vertically to the axis 8, and a central internal cone 9, which opens in the direction of the face 5. In the spindle head 1 an axially moveable collet 3 is coupled on the rear side with a control mechanism, which is also not illustrated. When a tool change is about to occur, said control mechanism allows the collet 3 to advance along the axis 8 in the direction of the face 5 for the purpose of releasing a hitherto used tool and to grasp a new tool; and, after the grasping procedure has been completed, said control mechanism allows said collet to move back again into the illustrated position. In so doing, the front end of the collet 3 and the shape of the internal cone 9 can be designed according to the ISO standards.

To make the spindle head 1 suitable for clamping a workpiece into an exact position with respect to an x, y, z orthogonal system without extensive reconstruction of said spindle head, there is, first of all, a slender, essentially cylindrical bolt 30 with an outer diameter that is virtually equal to that of the collet 3. The rear end 31 of the bolt 30 that tapers radially is provided with an external thread and is screwed into an internal thread, which is tapped into the collet 3. In this manner the bolt 30 constitutes an axial extension of the collet 3 in the hollow enclosing the internal cone 9 and hence participates in all movements of the collet 3.

On the front end 33 the bolt 30 carries a ball lock, comprising several balls, which are distributed uniformly over its circumference and of which two are labelled 32 and 34. An axial groove 38 at the front end 33 provides the bolt 30 with a ring wall, in whose radial, passage boreholes the balls of the ball lock are caught so as to be able to move radially to a limited degree, as will be explained below. The center of the floor of the groove 38 exhibits an axial bolt channel 66, which is closed by means of a stopper 36 with head 37, which rises over the floor and which will also be explained below.

Furthermore, a plate 10 is bolted to the free face 5 with screws 21, bears on its front side x-y references 12, 14, 16, 18 and at least one z reference 17 and exhibits a central passage opening 15, whose center line lies on the axis 8 and whose rear end has a radial expansion, forming a radial annular shoulder 19. A hollow cone 20 is connected with screws 26 to the rear side of the plate 10. The cone's central opening 22 faces the axis 8 and encloses the bolt 30 so as to guide it axially. The conical external contour of the hollow cone 20 is adapted to the rise of the internal cone 9 so that, when the plate 10 is fastened to the spindle head 1, the hollow cone 20 is securely seated in the internal cone 9.

Figure 2:
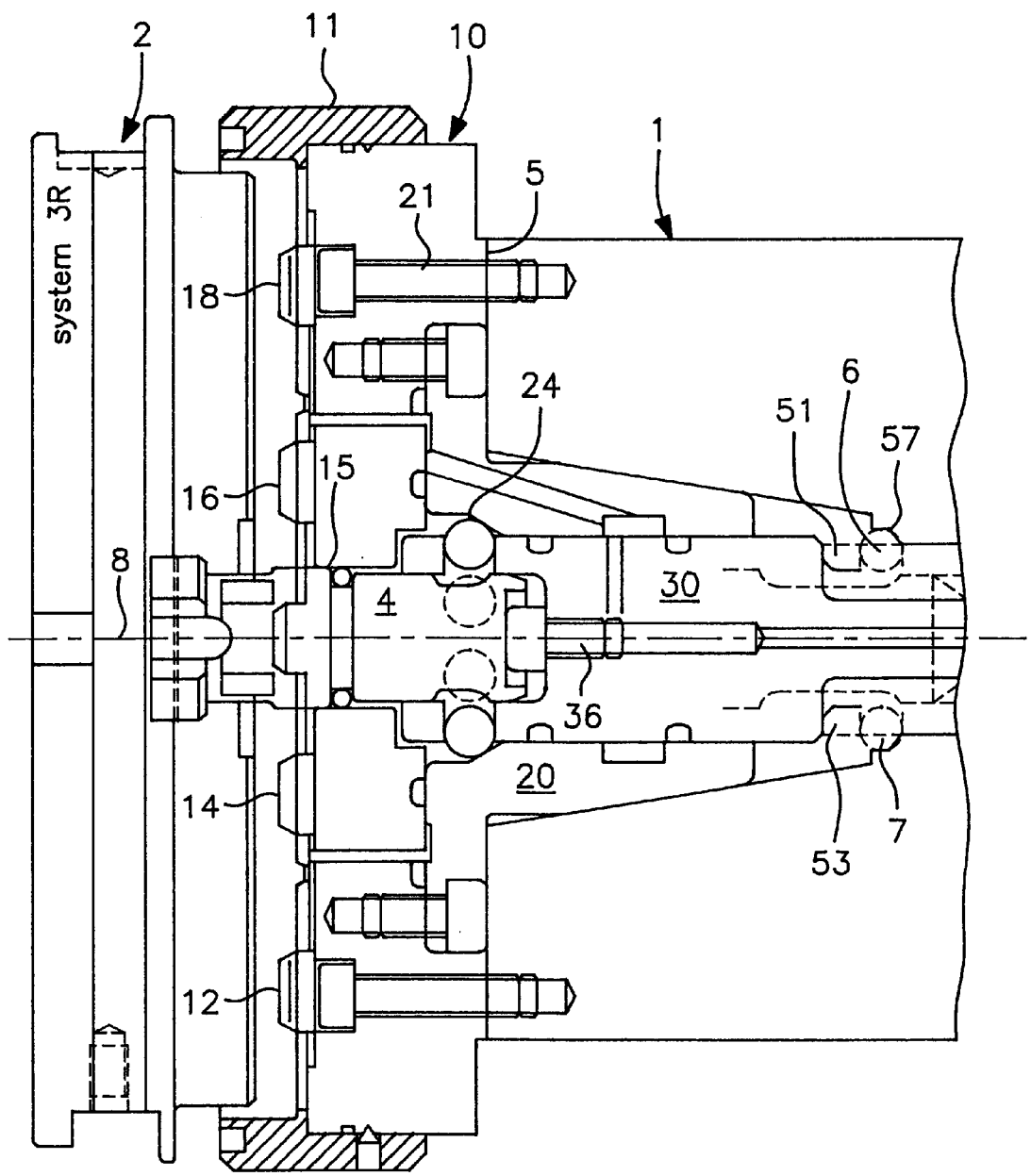
FIG. 2 is a drawing similar to FIG. 1 with the work-holding fixture detached from the spindle head.

The opening 22 exhibits in the vicinity of the plate 10 a radial expansion 24 with a ramp, which faces radially outwardly and in which the balls of the ball lock can escape radially, when the bolt 30 advances far enough in the direction of the plate 10, and then no longer protrude into the interior of the groove 38 (FIG. 2). In the retracted position of the bolt according to FIG. 1, the interior wall of the opening 22 displaces the balls so far radially inwardly that their spherical caps protrude into the interior of the groove 38 and can form there an effective coupling with a tension rod 4.

There is also a ring 11, which is fastened with elements 13 to the outer periphery of the plate 10 and protrudes axially beyond the front side, in particular beyond the x-y references 12, 14, 16, 18.

The tension rod 4 is fastened in the middle on the rear side of a work-holding fixture 2 by means that are not explained here in detail and protrudes axially beyond said fixture. The work-holding fixture 2 can be a pallet, on whose front side one or several workpieces (not illustrated) can be held. The essentially cylindrical tension rod 4 fits so as to move axially into the passage borehole 15 of the plate 10. In the vicinity of its free end the tension rod 4 exhibits an annular, radial depression 42, adapted to the shape of the said spherical caps of the balls; and the free face of the said tension rod has a central groove 44.

To clamp the pallet 2 to the spindle head 1, the collet 3 is moved to the front by the said control mechanism so that the face 35 of the bolt 30 moves in front of the annular shoulder 19 (FIG. 2). Now the pallet 2 is moved in such a manner in the direction of the front side of the plate 10 that the tension rod 4 dips with its front end through the passage opening 15 into the groove 38, and the floor of the groove 44 finally rests against the head 37. In so doing, the rear side of the pallet 2 pushes into the chamber, enclosed by the ring 11 and front side of the plate 10. In this respect profiles are envisaged that allow the pallet 2 to be fitted in only one of, for example, four specified directions of rotation with respect to the axis 8.

From this position of the pallet 2 in preparation for the clamping according to FIG. 2, the clamping takes place by retracting the collet 3. In so doing the balls 32, 34 ( and the other balls) of the ball lock are pushed radially inwardly by means of the ramp of the expansion 24 so that their spherical caps engage with the depression 42 and thus couple the tension rod 4 to the bolt 30. Thereupon, the tension rod 4 and thus the pallet 2 follow the rearward motion of the bolt 30. The retracting movement and thus the clamping of the pallet 2 are completed when one (of several) z counter-references, formed on the rear side of the pallet, comes to rest against the z reference 17 located on the front side of the plate 10. Then the x-y references 12, 14, 16, 18 engage with the x-y counter-references provided on the rear side of the pallet.

To increase the tension force there are compression springs (not illustrated), which are uniformly distributed around the passage opening 15 and each of which is braced against the annular shoulder 19 and rests against the face 35.

Furthermore, compressed air channels, which communicate with each other, pass through the plate 10, the hollow cone 20 and the bolt 30; said compressed air channels can be attached to an externally controlled compressed air source by means of a radial channel 62, which opens into the outer periphery of the plate 10 or the ring 11. In many cases the compressed air channels are provided with compressed air by the machine, to which the spindle head 1 is fastened, by means of an axial channel 70, which passes through the middle of the collet and is in alignment with the bolt channel 66. In so doing the radial channel 62 is closed on the outer periphery by means of a stopper 61. The compressed air channels serve to keep the z-reference 17 free of foreign particles.

To this end the radial channel 62 in the plate 10 opens by means of a cross intersecting channel 63 with respect to the z reference 17. At its internal end the radial channel 62 opens into a ring channel 64, which is formed between the rear side of the plate 10 and the front side of the hollow cone 20 and which in turn is connected with the bolt channel 66 by means of another cross intersecting channel 65 in the hollow cone 20 and a radial borehole 67 in the bolt 30.

In another alternative embodiment, shown by the dash-dotted line in the figures, the bolt 30 can be coupled with the collet 3 by means of a ball rim with balls 6 and 7 present at the end of the collet 3. It can compensate for any difference between the existing travel of the collet 3 and the small travel that is needed only for the bolt 30. To this end, the front end of the collet 3 exhibits several axially protruding fingers 51, 53, which are uniformly spaced in the circumferential direction and in which balls 6 and 7 are caught so as to be able to move radially to a limited degree. Between a thickened rear end 52 of the bolt 30 and a radial stop shoulder 58 of the bolt 30 there is a radially tapered and axially extending bolt segment 55, along which the balls 6, 7 can run axially. The inner wall 59 of the collet guide in the spindle head 1 forces the spherical caps of the balls 6, 7 against the bolt segment 55 so that the bolt is carried along by the collet 3 in its rearward motion. The forward travel of the bolt is caused by the fingers 51, 53 resting against the stop shoulder 58 of the bolt 30, which can be moved so far forward to overcome the said difference that the bolt 30 remains unaffected by the initial part of the collet forward and backward travel.

The uncoupling of the bolt 30 from the collet 3 is rendered possible by a radial expansion 57 of the inner wall 59 of the collet guide, into which the balls 6, 7 escape radially and thus can release the bolt 30.

What is claimed is:

1. A coupling for clamping a work-holding fixture (2) to a spindle head (1) of a machine tool in a repeatable and precise position relative to a spatial reference system, said work-holding fixture fastened to a tension rod (4) wherein a collet (3) is disposed within said spindle head and is axially movable with respect to a face (5) of said spindle head, the coupling comprising a plate (10), connectable to the face (5), said plate including spatial references (12, 14, 16, 18) on a front side of said plate, said plate defining a central passage opening (15) for receiving said tension rod (4) of the work-holding fixture (2), and a bolt (30) having a front end for coupling with the tension rod (4) and having a rear end for connecting with said collet (3).

2. A coupling as claimed in claim 1, wherein said bolt (30) is axially guidable within said central passageway of said plate (10).

3. A coupling as claimed in claim 1, wherein said front end of the bolt includes a ball lock (32, 34) for interacting with a profile (42) on the tension rod (4).

4. A coupling as claimed in claim 1, wherein said rear end of the bolt is screwed to the collet (3).

5. A coupling as claimed in claim 1, wherein said rear end of the bolt includes a bolt profile region (52,55) for engagement with a ball rim (6, 7) of said collet.

6. A coupling as claimed in claim 1, further comprising a hollow cone (20) defining an axial passage borehole (22), said cone fastened on a rear side of the plate (10), wherein said bolt (30) is positioned and guided within said borehole (22).

7. A coupling as claimed in claim 5, wherein said rear end of said bolt includes a radial stop shoulder (58) for abutment with said collet (3).

8. A coupling as claimed in claim 5 wherein said bolt (30) and said plate (10) include communicating pressure medium channels (62, 63, 64, 65, 67, 66), which open into a z reference of the spatial reference system.

9. A coupling as claimed in claim 1, further comprising at least one compression spring which increases the tension force and which is braced between the plate (10) and the bolt (30).

10. A coupling as claimed in claim 8 wherein said hollow cone (20) includes said communicating pressure medium channels.

\* \* \* \* \*